US007256874B2

(12) United States Patent
Csulits et al.

(10) Patent No.: US 7,256,874 B2
(45) Date of Patent: Aug. 14, 2007

(54) MULTI-WAVELENGTH CURRENCY AUTHENTICATION SYSTEM AND METHOD

(75) Inventors: Frank M. Csulits, Gurnee, IL (US); David J. Mecklenburg, Glendale Heights, IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 433 days.

(21) Appl. No.: 10/684,027

(22) Filed: Oct. 10, 2003

(65) Prior Publication Data

US 2004/0145726 A1 Jul. 29, 2004

Related U.S. Application Data

(60) Provisional application No. 60/419,453, filed on Oct. 18, 2002, provisional application No. 60/422,322, filed on Oct. 30, 2002.

(51) Int. Cl.
*G06K 9/74* (2006.01)

(52) U.S. Cl. ......................... 356/71; 382/181; 382/191

(58) Field of Classification Search ..................... None
See application file for complete search history.

(56) References Cited

U.S. PATENT DOCUMENTS

| | | | | |
|---|---|---|---|---|
| 5,295,196 | A * | 3/1994 | Raterman et al. | 382/135 |
| 5,757,001 | A * | 5/1998 | Burns | 250/339.11 |
| 5,895,073 | A * | 4/1999 | Moore | 283/70 |
| 6,241,069 | B1 * | 6/2001 | Mazur et al. | 382/135 |
| 6,473,165 | B1 * | 10/2002 | Coombs et al. | 356/71 |
| 6,903,342 | B2 * | 6/2005 | Chien | 250/341.1 |

FOREIGN PATENT DOCUMENTS

| | | |
|---|---|---|
| EP | 0314 312 A2 | 5/1989 |
| GB | 2355522 A | 4/2001 |
| WO | WO 99/50796 | 10/1999 |

OTHER PUBLICATIONS

PCT International Search Report for PCT/US 03/33038 dated Apr. 8, 2004.

* cited by examiner

*Primary Examiner*—Layla G. Lauchman
*Assistant Examiner*—Juan D. Valentin, II
(74) *Attorney, Agent, or Firm*—Nixon Peabody LLP

(57) ABSTRACT

A counterfeit determination is made with respect to currency bills by illuminating the currency bill with multiple wavelengths of light. Genuine currency bills include indicia printed with an ink that responds similarly to infra-red illumination at two different wavelengths. To identify a test currency as a suspect counterfeit, the bill is first illuminated with infra-red light at a first wavelength. A measurement is then made of a first reflected light response from the first illumination. The test currency bill is then second illuminated with infra-red light at a second wavelength. A measurement is then made of a second reflected light response from the second illumination. The first and second reflected light responses are then compared, and the test currency bill is identified as a suspect counterfeit if the first and second reflected light responses are not substantially the same.

46 Claims, 2 Drawing Sheets

MULTI-WAVELENGTH CURRENCY AUTHENTICATION SYSTEM AND METHOD

PRIORITY CLAIM AND CROSS REFERENCE

The present application claims priority from co-pending U.S. Provisional Application for Patent Ser. Nos. 60/419,453, filed Oct. 18, 2002, and 60/422,322, filed Oct. 30, 2002, the disclosures of which are hereby incorporated by reference.

FIELD OF THE INVENTION

The present invention relates generally to the field of currency handling systems and, more particularly, to methods and systems for authenticating currency bills.

BACKGROUND OF THE INVENTION

A variety of techniques and apparatuses have been used to determine the authenticity of currency bills (or other documents). These techniques generally implicate optically scanning or imaging the documents along with the processing of the resulting scan or image data in comparison to certain metrics. If the metrics are satisfied (or not satisfied, as the case may be), then the document is identified as suspect. The document may then be discarded because it is presumed to not be authentic or it can be sent on for further handling and consideration, perhaps using other tests or analyses, to confirm that it is not authentic. A common concern with prior art document scanning and imaging techniques is accuracy. Another common concern with the prior art techniques is speed. A need exists in the art for a method and system for determining the authenticity of documents which possesses improved accuracy rates and further can be implemented in automated system which operate at high document processing rates. It would further be an advantage if the system and method could be implemented in compact document handling systems, and if the system and method were inexpensive.

SUMMARY OF THE INVENTION

A document authentication scanning system and method in accordance with the present invention illuminates at least one side of a document with first and second wavelengths of light. More particularly, the illumination is made alternately between the first and second wavelengths. Reflected light from the document is detected and an authentication determination is made based on a comparison of the reflected first wavelength of light to the reflected second wavelength of light. In one embodiment, the document is not authentic if the detected reflected light differs between the first and second wavelengths.

In accordance with an embodiment of the present invention, there is a provided a system and method for authenticating a stack of currency bills. The bills in the stack are transported, one bill at a time (preferably, wide edge leading), from an input through an evaluation region to an output. As the bills pass through the evaluation region, at least one side is alternately illuminated with first and second wavelengths of light. An identification of the passing bill as a counterfeit is then made based on a detected difference between a first response associated with illuminating the bill with the first wavelength of light and a second response associated with illuminating the bill with the second wavelength of light.

In a preferred embodiment, the first and second wavelengths of light are selected to be in the infra-red region of the spectrum.

The above summary of the present invention is not intended to represent each embodiment, or every aspect, of the present invention. Additional features and benefits of the present invention will become apparent from the detailed description, figures, and claims set forth below.

BRIEF DESCRIPTION OF THE DRAWINGS

A more complete understanding of the invention will become apparent upon reading the following detailed description in conjunction with the attached drawings wherein.

DETAILED DESCRIPTION OF THE DRAWINGS

Figure 1:
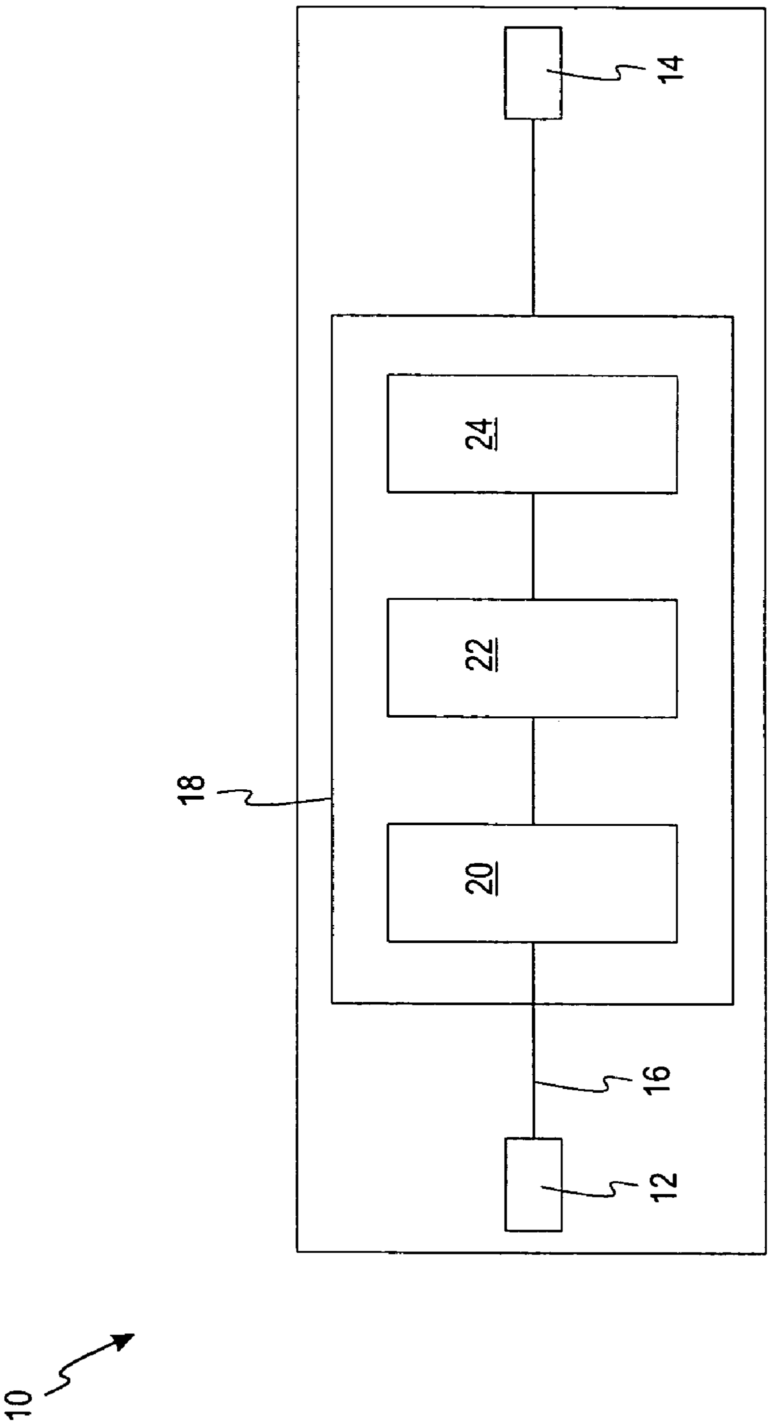
FIG. 1 is a block diagram illustrating a currency processing system in accordance with an embodiment of the present invention.

Reference is now made to FIG. 1 wherein there is shown a currency (or other document) handling system 10 comprising an input 12 and an output 14. A transport device or mechanism 16 conveys currency bills (or other documents needing authentication) from the input 12 (for example, an input receptacle) to the output 14 (for example, a plurality of output receptacles). An evaluation unit 18 is operatively positioned, although not necessarily physically positioned, between the input 12 and the output 14. The transport mechanism 16 is adapted to transport bills/documents, received either individually or in brick stacks, one at a time through a fitness detector evaluation unit 18. The evaluation unit 18 may be adapted to evaluate any number of predetermined characteristics of the passing bills/documents. Based on a determination made with respect to each bill/document, it is sorted in connection with its delivery to the output 14 by separating the bills/documents into certain ones of the included output receptacles. This sortation may include taking a bill/document out of circulation, sending a bill/document to a counterfeit receptacle, sending a bill/document to a certain denomination receptacle, and the like.

In one example of evaluation, each bill is transported past a first detector 20 and then a second detector 22 followed by transport past a third detector 24. It will be understood that the evaluation detector 18 may comprise one or more of detectors for determining a predetermined criteria. Each detector may be used to address a different criteria, or alternatively plural detectors may be used with respect to the same criteria.

Figure 2:
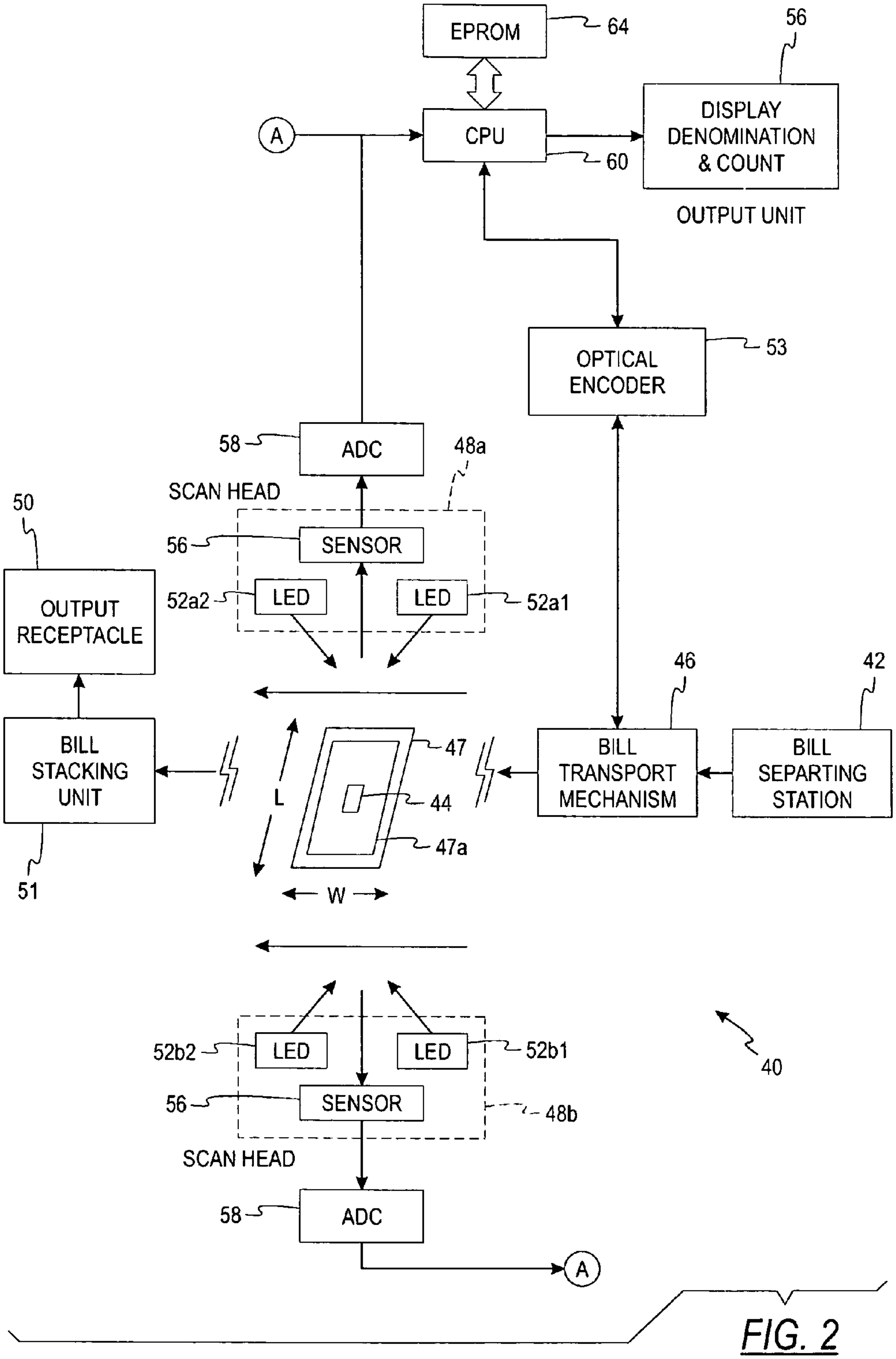
FIG. 2 is a block diagram for a multi-pocket evaluation device.

Reference is now made to FIG. 2, wherein there is shown a block diagram for a multi-pocket evaluation device 40. Although the following description focuses on the handling of currency bills, it will be understood that the device 40 is equally useful in evaluating other types of documents, and especially those documents which need to be authenticated.

The device 40 includes an input receptacle 42 (including a bill separation functionality) for receiving a stack of currency bills to be processed (for example, counted, denominated, authenticated, and the like). Currency bills in the input receptacle 42 are picked out or separated, one bill at a time, and sequentially relayed by a bill transport mechanism 46 for transport between a pair of scanheads 48*a* and 48*b* where, for example, currency authentication of each bill is performed. In the illustrated embodiment, each scanhead 48 is an optical scanhead that scans for optical characteristic information from a scanned bill 47 which is used to determine the authentication of the bill. The scanned bill 47 is then transported through a sortation functionality to a selected one of a plurality of output receptacles 50. Although a plurality of receptacles 50 are illustrated, it will be understood that the device may be implemented with just a single output receptacle. Each of the receptacles 50 includes a stacking unit 51 which operates to assist in stacking the bills within the receptacles 50 for subsequent removal. The device 40 includes an operator interface 53 with a display 56 for communicating information to an operator of the device 40, and buttons 57 for receiving operator input.

Additional sensors may replace or are used in conjunction with the optical scanheads 48*a* and 48*b* in the device 40 to analyze, authenticate, denominate, count, and/or otherwise process currency bills. These sensors comprise the detectors 20-24 described above in connection with FIG. 1. For example, size detection sensors, magnetic sensors, thread sensors, and/or ultraviolet/fluorescent light sensors may be used in the currency processing device 40 to evaluate currency bills. Uses of these types of sensors for currency evaluation are described in commonly owned U.S. Pat. No. 6,278,795, which is incorporated herein by reference in its entirety. Likewise, one or more embodiments of fitness detectors may be used in connection with the optical scanners.

In a preferred implementation for currency bill authentication, with respect to one of the included detectors 20-24, each optical scanhead 48*a* and 48*b* comprises a pair of light sources 52*a* and 52*b*, such as light emitting diodes 52*a*1, 52*a*2, 52*b*1 and 52*b*2, that direct light onto the bill transport path so as to illuminate passing currency bills. In a particular implementation, the light sources 52*a* and 52*b* are configured to illuminate a substantially rectangular light strip 44 upon a passing currency bill 47 positioned on the transport path adjacent the scanhead 48. Light reflected off the currency bill, in general, and the illuminated strip 44, in particular, is sensed by a photodetector 56 positioned between the two light sources. The analog output of the photodetector 56 is converted into a digital signal by means of an analog-to-digital convertor ("ADC") 58 whose output is fed as a digital input to a processor such as central processing unit (CPU) 60. The CPU 60 processes the digital inputs, for example, by comparison, to make authentication determinations.

The bill transport path is defined in such a way that the transport mechanism 46 moves currency bills with the narrow dimension of the bills parallel to the transport path and the scan direction. As a bill 47 traverses the scanheads 48 the light strip 44 effectively scans the bill across the narrow dimension of the bill 47. In the depicted embodiment, the transport path is arranged so that a currency bill 47 is scanned across a central section of the bill along its narrow dimension, as shown in FIG. 2. Each scanhead functions to detect light reflected from the bill 47 as it moves across the illuminated light strip 44 and to provide an analog representation of the variation in reflected light, which, in turn, represents the variation in the dark and light content of the printed pattern or indicia on the surface of the bill 47. This variation in light reflected from the narrow dimension scanning of the bills serves as a measure for distinguishing, with a high degree of confidence, among a plurality of currency denominations that the system is programmed to process. As will be discussed in further detail herein, this reflected light can also be processed to make accurate authentication determinations as well.

In order to ensure strict correspondence between reflectance samples obtained by narrow-dimension scanning of successive bills, the initiation of the reflectance sampling process is preferably controlled through the controller 60 (e.g., CPU) by means of an optical encoder 53 which is linked to the bill transport mechanism 46 and precisely tracks the physical movement of the bill 47 across the scanhead 48. More specifically, the optical encoder 53 is linked to the rotary motion of the drive motor which generates the movement imparted to the bill as it is relayed along the transport path. In addition, the mechanics of the feed and transport mechanism (see U.S. Pat. No. 5,295,196) ensure that positive contact is maintained between the bill and the transport path, particularly when the bill is being scanned by the scanhead 48. Under these conditions, the optical encoder 53 is capable of precisely tracking the movement of the bill 47 relative to the light strip 44 generated by the scanhead 48 by monitoring the rotary motion of the drive motor.

The output of the photodetector 56 is monitored by the controller 60 to initially detect the presence of the bill underneath the scanhead 48 and, subsequently, to detect the starting point of the printed pattern on the bill, as represented by the thin borderline 47A which typically encloses the printed indicia on bills. Once the borderline 47A has been detected, the optical encoder 53 is used to control the timing and number of reflectance samples that are obtained from the output of the photodetector 56 as the bill 47 moves across the scanhead 111 and is scanned along its narrow dimension.

The use of the encoder 53 for controlling the sampling process relative to the physical movement of a bill 47 across the scanhead 48 is also advantageous in that the encoder 53 can be used to provide a predetermined delay following detection of the borderline prior to initiation of sampling. The encoder delay can be adjusted in such a way that the bill 47 is scanned only across those segments along its narrow dimension which contain the most distinguishable printed indicia relative to the different currency denominations.

In the case of U.S. currency, for instance, it has been determined that the central, approximately two-inch (5 cm) portion of bills, as scanned across the central section of the narrow dimension of the bill, provides sufficient data for distinguishing among the various U.S. currency denominations on the basis of the correlation technique disclosed in U.S. Pat. No. 5,295,196. Accordingly, the encoder 53 can be used to control the scanning process so that reflectance samples are taken for a set period of time and only after a certain period of time has elapsed after detection of the borderline 47A, thereby restricting the scanning to the desired central portion of the narrow dimension of the bill.

The controller 60 is programmed to count the number of bills belonging to each currency denomination as part of a given batch of bills that have been scanned, and to determine the aggregate total of the currency amount represented by the scanned bills in that batch. The controller 60 is also linked to an EPROM 64 and an output unit 56 which provides a display of the number of bills counted, the breakdown of the bills in terms of denomination, and the aggregate total of the currency value represented by the counted bills. The output unit 56 can also be adapted to provide a print-out of the displayed information in a desired format.

The scanhead 48 may comprise multiple scanheads positioned next to each other, or a single stationary scanhead extending across the entire width of the documents being scanned. In this case, the same scanhead may be used to generate the data needed to denominate bills and to display and store the images that appear on bills and other types of documents. For example, the electronic data from a single scanhead may be used to denominate bills, and to store images of bills, checks and other documents. Alternatively, the same data may be used to also store images of only the serial numbers of bills. One example of such a full-width scanhead is the aforementioned PI228MC-A4 Contact Image Sensor (CIS) Module made by Peripheral Imaging Corporation in San Jose, Calif.

Two-sided scanning may be used to permit bills to be fed into a currency discrimination unit with either side face up, and also to permit high-speed scanning of images on both sides of the documents being scanned. An example of a two-sided scanhead arrangement is disclosed in U.S. Pat. No. 5,467,406, which is incorporated herein by reference in its entirety. Master patterns generated by scanning genuine bills may be stored for segments on one or both sides of bills of all denominations. In the case where master patterns are stored from the scanning of only one side of a genuine bill, the patterns retrieved by scanning both sides of a bill under test may be compared to a master set of single-sided master patterns. In such a case, a pattern retrieved from one side of a bill under test should match one of the stored master patterns, while a pattern retrieved from the other side of the bill under test should not match any of the master patterns. Alternatively, master patterns may be stored for both sides of genuine bills. In such a two-sided system, a pattern retrieved by scanning one side of a bill under test should match one of the master patterns for one side (Match 1) of a genuine bill, and a pattern retrieved from scanning the opposite side of the bill under test should match one of the master patterns of the opposite side of a genuine bill (Match 2).

A counterfeit detection function may also be included in the discrimination and authentication unit. A variety of different counterfeit detection techniques are well known and have been incorporated in currency discriminators. These known counterfeit detectors detect a variety of different types of characteristic information from currency bills, and employ a variety of different detection means such as magnetic, optical of capacitive sensors. These include detection of patterns of changes in magnetic flux (U.S. Pat. No. 3,280,974), patterns of vertical grid lines in the portrait area of bills (U.S. Pat. No. 3,870,629), the presence of a security thread (U.S. Pat. No. 5,151,607), total amount of magnetizable material of a bill (U.S. Pat. No. 4,617,458), patterns from sensing the strength of magnetic fields along a bill (U.S. Pat. No. 4,593,184), and other patterns and counts from scanning different portions of the bill such as the area in which the denomination is written out (U.S. Pat. No. 4,356,473).

With regard to optical sensing, a variety of currency characteristics can be measured such as density (U.S. Pat. No. 4,381,447), color (U.S. Pat. Nos. 4,490,846; 3,496,370; 3,480,785), length and thickness (U.S. Pat. No. 4,255,651), the presence of a security thread (U.S. Pat. No. 5,151,607) and holes (U.S. Pat. No. 4,381,447), and other patterns of reflectance and transmission (U.S. Pat. Nos. 3,496,370; 3,679,314; 3,870,629; 4,179,685). Color detection techniques may employ color filters, colored lamps, and/or dichromic beamsplitters (U.S. Pat. Nos. 4,841,358; 4,658,289; 4,716,456; 4,825,246, 4,992,860 and EP 325,364). An optical sensing system using ultraviolet light is described in U.S. Pat. No. 5,640,463, incorporated herein by reference.

In addition to magnetic and optical sensing, other techniques of detecting characteristic information of currency include electrical conductivity sensing, capacitive sensing (U.S. Pat. No. 5,122,754—watermark, security thread; U.S. Pat. No. 3,764,899—thickness; U.S. Pat. No. 3,815,021—dielectric properties; U.S. Pat. No. 5,151,607—security thread), and mechanical sensing (U.S. Pat. No. 4,381,447—limpness; U.S. Pat. No. 4,255,651—thickness).

A UV authenticating technique can be employed along with one or more other authenticating and/or discrimination techniques in alternative embodiments of the imaging system. For example, the imaging system may include both a UV authenticating system and a magnetic authenticating system. It is known that genuine U.S. bills reflect a high level of UV light and do not fluoresce in response to UV illumination, except in certain special cases described below. An embodiment of the imaging system employing both UV and magnetic authentication would be able to detect a counterfeit U.S. bill that passes the UV authentication test (e.g., reflects sufficient level of UV light and does not fluoresce in response to UV illumination), but fails the magnetic authentication test. Put another way, an embodiment of the imaging system that implements a plurality of authentication tests is able to detect counterfeit bills that would otherwise go undetected where only one authenticating test is employed. Further details of a currency processing system employing UV, fluorescence and magnetic authentication tests are described in detail in U.S. Pat. No. 6,363,164, which has been incorporated by reference.

Security features added to U.S. currency beginning with the 1996 series $100 bills include the incorporation into the bills of security threads that fluoresce under ultraviolet light. For example, the security threads in the 1996 series $100 bills emit a red glow when illuminated by ultraviolet light. The color of light emitted by security threads under ultraviolet light will vary by denomination, e.g., with the $100 bills emitting red light and the $50 bills emitting blue or purple light. Thus, the red light emitted from the security thread of a $100 bill in response to UV illumination can be used to both authenticate and denominate that bill.

In particular, an embodiment of the system for authenticating bills (for example, identifis presented wherein the LEDs 52 used are LEDs which emit light at different wavelengths (for example, at 880 nm and 940 nm in the IR part of the spectrum). More specifically, LED **52*a*1 may operate at 880 nm while LED 52*a*2 may operate at 940 nm. Similarly, LED 52*b*1 may operate at 880 nm while LED 52*b*2 operates at 940 nm. This multiple wavelength approach takes advantage of a characteristic of inks which are used on non-genuine currency bills wherein the ink reflects the different incident wavelengths differently. In contrast, the ink used on authentic currency bills reflects the different wavelengths of light similarly. In operation, the currency bill is first illuminated at one wavelength (for example, 880 nm) and then illuminated at the other wavelength (for example, 940 nm). Because genuine currency bill ink responds to such illumination in a substantially identical manner, the detected reflected light from these alternate, successive illuminations should correspondingly be substantially identical (or otherwise correlated). The sensed reflection signal produced by the detector 56 will approximate a flat line (or level) response when genuine currency is successively alternately illuminated with different wavelengths. Conversely, because non-genuine currency bill ink has a different illumination frequency response, the detected reflected light from these alternate, successive illuminations should correspondingly be different (or non-correlated). In this case, sensed reflection signal produced by the detector 56** will vary (a blinking effect in the sensed light reflection will be detected) when alternate illumination is applied. For U.S. currency, there is an advantage to looking at the green side of the bill when using this multiple wavelength approach. With a counterfeit bill, the reflected multi-wavelength light from the entire green side can be detected to blink. Thus, the counterfeit bill is easier to detect.

A significant advantage of the counterfeit detection process described above is that continuous operation of the transport mechanism 46 is supported while detection occurs. There is no need to statically test each bill under a fixed camera or imager. Preferred embodiments operate at speeds of at least about 800 bills-per-minute (bpm). The higher the speed, the faster the controller 60 needs to control the alternate actuation of the LEDs (on/off or perhaps vary the on intensity level). For example, when operating to transport bills at 1000 bpm, it is preferred that the LEDs be switched every 1/1000th of a second. Furthermore, when operating to transport bills at 1200 bpm, the LEDs are preferably switched every 1/1200th of second.

As shown in FIG. 2, two sets of LEDs may be used; LEDs **52*a*1 and 52*a*2 on the top and LEDs 52*b*1 and 52*b*2 on the bottom. Although authentication may selectively be done on only one side, e.g., the green side or the black side, upper and lower modules 48*a* and 48*b* avoid the need to have all bills facing green side up, for example. For some applications, the LEDs 52*a*1 and 52*a*2 are LED arrays (each comprising perhaps a plurality of LEDs) adapted to operate at different wavelengths, e.g., 880 nm and 940 nm. A similar configuration may be implemented with respect to the lower LEDs 52*b*1 and 52*b*2**.

An advantage of using the present counterfeit detection system which operates to cycle (alternate) the LED light sources is that the light sources can be operated in a strobe mode to pick up different zones, e.g., different IR zones on the bills. The light source LEDs 52 can be adapted to illuminate predetermined zones in a predetermined order. If, for example non-visible ink becomes visible upon illumination of a particular zone, the sensor will detect the visible ink. Tests, such as authenticity and denomination tests, can be based on the presence or absence of visible ink in a particular zone illuminated with a spectrum of pre-selected light. This strobe test or other tests, e.g., other counterfeit tests as described herein, can be combined with a dual-wavelength test describe above. Thus, in some embodiments, each LED is independently controlled to affect its state (intensity), such as high, low, on, off.

Additional details of the device 40 illustrated in FIG. 2 and processes for using the same are described in U.S. Pat. Nos. 5,295,196 and 5,815,592, each of which is incorporated herein by reference in its entirety. According to various alternative embodiments, the currency processing device 40 is capable of processing, including fitness evaluating and denominating the bills, singularly or in combination, from about 800 to over 1500 bills per minute. Furthermore, a multi-functional processor may be programmed to only evaluate fitness, for example, of bills at speeds from about 800 to over 1500 bills per minute.

While the device 40 of FIG. 2 has been described as a device capable of determining the denomination and authenticity of processed bills, it may alternatively or additionally function as a note counting device. Note counting devices are disclosed in commonly owned U.S. Pat. Nos. 6,026,175 and 6,012,565 and in commonly owned, co-pending U.S. patent application Ser. No. 09/611,279, filed Jul. 6, 2000, each of which is incorporated herein by reference in its entirety. Note counting devices differ from currency denominating devices in that note counting devices do not denominate the currency bills being processed and are not designed to process and determine the total value of a stack of mixed denomination currency bill. But fitness detection may also be used in note counting devices.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

What is claimed is:

1. A method of processing documents, comprising:
receiving a document at an input receptacle;
transporting the document from the input receptacle along a transport path to an output receptacle;
alternately illuminating the transported document with at least two wavelengths of light;
sensing a response from each illumination of the document;
comparing the responses from each illumination against each other; and
generating and outputting a sensed reflection signal indicative of a characteristic of the document based on comparison differences or similarities with respect to illumination response to the at least two wavelengths of light.

2. The method of claim 1 wherein the document includes indicia printed thereon using ink having different illumination response characteristics at the at least two wavelengths of light, and the generating is responsive to a comparison difference in response.

3. The method of claim 1 wherein the document includes indicia printed thereon using ink having similar illumination response characteristics at the at least two wavelengths of light, and the generating is responsive to a comparison similarity in response.

4. The method of claim 1, wherein the characteristic of the document comprises document authenticity.

5. The method of claim 1, wherein alternately illuminating the document comprises alternately switching between a first wavelength of light illumination and a second wavelength of light illumination.

6. The method of claim 5, wherein the first wavelength of light is about 880 nm and the second wavelength is about 940 nm.

7. The method of claim 1 wherein the document is a currency bill.

8. A document processing system, comprising:
an input receptacle receiving a document;
a transport mechanism for conveying the document from the input receptacle along a transport path to an output receptacle;
a scanning system including a light source operating to alternately illuminate the transported document with at least two wavelengths of light;
a light sensor that senses a response from each illumination of the document; and
a processor to compare the responses from each illumination against each other and determine a characteristic of the document based on comparison differences or similarities with respect to illumination response to the at least two wavelengths of light.

9. The system of claim 8 wherein the document includes indicia printed thereon using ink having different illumination response characteristics at the at least two wavelengths of light, and the processor makes its determination based on a comparison difference in response.

10. The system of claim 8 wherein the document includes indicia printed thereon using ink having similar illumination response characteristics at the at least two wavelengths of light, and the processor makes its determination based on a comparison similarity in response.

11. The system of claim 8, wherein the characteristic of the document comprises document authenticity.

12. The system of claim 8, wherein the scanning system alternately illuminates the document by alternately switching between a first wavelength of light illumination and a second wavelength of light illumination.

13. The system of claim 12, wherein the first wavelength of light is about 880 nm and the second wavelength is about 940 nm.

14. The system of claim 8 wherein the document is a currency bill.

15. A method of authenticating currency bills, comprising:

receiving a stack of currency bills in an input receptacle;

transporting the stack of currency bills, on an individual bill-by-bill basis, from the input receptacle along a transport path to an output receptacle;

alternately illuminating each currency bill with at least two wavelengths of light;

sensing, for each illuminated currency bill, a first response associated with illumination at a first wavelength of light and a second response associated with illumination at a second wavelength of light; and generating and outputting a sensed reflection signal indicative of an authentication determination for each currency bill based on a comparison between the first response and the second response.

16. The method of claim 15 wherein the currency bill includes indicia printed thereon using ink having different illumination response characteristics at the at least two wavelengths of light, and the generating is based on a comparison difference between the first and second responses.

17. The method of claim 15 wherein the currency bill includes indicia printed thereon using ink having similar illumination response characteristics at the at least two wavelengths of light, and the generating is based on a comparison similarity in the first and second responses.

18. The method of claim 15 wherein alternately illuminating comprises repeatedly alternately illuminating each currency bill with at least two wavelengths of light.

19. The method of claim 18 wherein repeatedly alternately illuminating comprises repeating alteration between the at least two wavelengths of light at a switching rate related to a rate with which the currency bills are transported along the transport path.

20. The method of claim 15, wherein alternately illuminating the currency bill comprises alternately switching between a first wavelength of light illumination and a second wavelength of light illumination.

21. The method of claim 20, wherein the first wavelength of light is about 880 nm and the second wavelength of light is about 940 nm.

22. The method of claim 15 wherein alternately illuminating comprises selectively alternately illuminating certain portions of each currency bill.

23. The method of claim 15, wherein alternately illuminating comprises performing alternate illumination as to both a first side and a second side of each currency bill.

24. The method of claim 23, wherein generating comprises comparing first and second responses as to the currency bill based on the illumination of either the first side or the second side of the currency bill.

25. The method of claim 15, wherein alternately illuminating comprises strobing light at the first and second wavelengths to illuminate a selected portion of the currency bill, and the generating comprises determining authenticity based on whether first and second responses are sensed with respect to that selected portion.

26. The method of claim 15, wherein alternately illuminating comprises switching between illumination at a first wavelength and a second wavelength in accordance with a rate at which currency bills are transported.

27. The method of claim 15, wherein transporting the currency bills comprises transporting the currency bills at a rate greater than 600 bills-per-minute.

28. The method of claim 15, wherein transporting the currency bills comprises transporting the currency bills at a rate between about 1200 bills-per-minute and about 1500 bills-per-minute.

29. A currency bill authentication system, comprising:

an input receptacle receiving a stack of currency bills;

a transport mechanism transporting the stack of currency bills, on an individual bill-by-bill basis, from the input receptacle along a transport path to an output receptacle;

a scanning system including a light source operating to alternately illuminate each currency bill with at least two wavelengths of light;

a light sensor that senses, for each illuminated currency bill, a first response associated with illumination at a first wavelength of light and a second response associated with illumination at a second wavelength of light; and a processor that makes an authentication determination for each currency bill based on a comparison between the first response and the second response.

30. The system of claim 29 wherein the currency bill includes indicia printed thereon using ink having different illumination response characteristics at the at least two wavelengths of light, and the making determination is based on a comparison difference between the first and second responses.

31. The system of claim 29 wherein the currency bill includes indicia printed thereon using ink having similar illumination response characteristics at the at least two wavelengths of light, and the making determination is based on a comparison similarity in the first and second responses.

32. The system of claim 29 wherein the scanning system alternately illuminates the currency bill by repeatedly alternately illuminating each currency bill with at least two wavelengths of light.

33. The system of claim 32 wherein the scanning system repeatedly alternately illuminates by switching between the at least two wavelengths of light at a switching rate related to a rate with which the currency bills are transported along the transport path.

34. The system of claim 29, wherein the scanning system alternately illuminates the currency bill by alternately switching between a first wavelength of light illumination and a second wavelength of light illumination.

35. The system of claim 34, wherein the first wavelength of light is about 880 nm and the second wavelength of light is about 940 nm.

36. The system of claim 29 wherein the scanning system selectively alternately illuminates certain portions of each currency bill.

37. The system of claim 29, wherein the scanning system includes a first and second light source operating to alternately illuminate both a first side and a second side, respectively, of each currency bill.

38. The system of claim 37, wherein the processor makes the authentication determination by comparing first and second responses as to the currency bill based on the illumination of either the first side or the second side of the currency bill.

39. The system of claim 29, wherein the scanning system alternately illuminates by strobing light at the first and second wavelengths to illuminate a selected portion of the currency bill, and wherein the processor determines authenticity based on whether first and second responses are sensed with respect to that selected portion.

40. The system of claim 29, wherein the scanning system alternately illuminates by switching between illumination at a first wavelength and a second wavelength in accordance with a rate at which currency bills are transported.

41. The system of claim 29, wherein the transport mechanism transports the currency bills at a rate greater than 600 bills-per-minute.

42. The system of claim 29, wherein the transport mechanism transports the currency bills at a rate between about 1200 bills-per-minute and about 1500 bills-per-minute.

43. A method for making a counterfeit determination with respect to currency bills, wherein genuine currency bills include indicia printed with an ink that responds similarly to infra-red illumination at two different wavelengths, comprising:

first illuminating a test currency bill with infra-red light at a first wavelength;

sensing a first reflected light response from the first illumination;

second illuminating the test currency bill with infra-red light at a second wavelength;

sensing a second reflected light response from the second illumination;

comparing the first and second reflected light responses; and generating and outputting a sensed reflection signal indicating the test currency bill to be suspect counterfeit if the compared first and second reflected light responses are not substantially the same.

44. The method of claim 43, wherein the first wavelength is about 880 nm and the second wavelength is about 940 nm.

45. A system for making a counterfeit determination with respect to currency bills, wherein genuine currency bills include indicia printed with an ink that responds similarly to infra-red illumination at two different wavelengths, comprising:

a first light source that illuminates a test currency bill with infra-red light at a first wavelength;

a detector to sense a first reflected light response from the first illumination;

a second light source that illuminates the test currency bill with infra-red light at a second wavelength;

the detector sensing a second reflected light response from the second illumination;

a processor to compare the first and second reflected light responses, and identify the test currency bill to be suspect counterfeit if the compared first and second reflected light responses are not substantially the same.

46. The system of claim 45, wherein the first wavelength is about 880 nm and the second wavelength is about 940 nm.

* * * * *

UNITED STATES PATENT AND TRADEMARK OFFICE

CERTIFICATE OF CORRECTION

PATENT NO. : 7,256,874 B2
APPLICATION NO. : 10/684027
DATED : August 14, 2007
INVENTOR(S) : Frank M. Csultis et al.

It is certified that error appears in the above-identified patent and that said Letters Patent is hereby corrected as shown below:

Title Page, Left Column, Item (60), Related U.S. Application Data, please replace with the following:

-- Provisional application No. 60/419,453, filed on Oct. 18, 2002, provisional application No. 60/422,332, filed on Oct. 30, 2002. --

Col. 1, Lines 6-10, Priority Claim and Cross Reference, please replace with the following:

-- The present application claims priority from co-pending United States Provisional Application for Patent Serial Nos. 60/419,453, filed October 18, 2002, and 60/422,332, filed October 30, 2002, the disclosures of which are hereby incorporated by reference. --

Signed and Sealed this

Sixth Day of April, 2010

David J. Kappos

*Director of the United States Patent and Trademark Office*